ELECTRICAL SWITCHING APPARATUS FOR HIGH FREQUENCY SIGNALS

Filed May 2, 1962 3 Sheets-Sheet 1

*INVENTORS*
ANDREW W. VINCENT
DAVID E. BELLES
*BY*
Hoffman Stone
Attorney

May 10, 1966 A. W. VINCENT ETAL 3,250,860

ELECTRICAL SWITCHING APPARATUS FOR HIGH FREQUENCY SIGNALS

Filed May 2, 1962 3 Sheets-Sheet 2

INVENTORS
ANDREW W. VINCENT
DAVID E. BELLES
BY
Hoffman Stone
Attorney

ELECTRICAL SWITCHING APPARATUS FOR HIGH FREQUENCY SIGNALS

Filed May 2, 1962 3 Sheets-Sheet 3

INVENTORS
ANDREW W. VINCENT
DAVID E. BELLES
BY
Hoffman Stone
Attorney

United States Patent Office 3,250,860
Patented May 10, 1966

3,250,860
ELECTRICAL SWITCHING APPARATUS FOR HIGH FREQUENCY SIGNALS

Andrew W. Vincent, 65 Aberdeen St., Rochester, N.Y., and David E. Belles, Rochester, N.Y.; said Belles assignor to James Cunningham Son & Co., Inc., Honey Falls, N.Y., a corporation of New York
Filed May 2, 1962, Ser. No. 191,803
19 Claims. (Cl. 179—78)

This invention relates to a novel electrical switching apparatus especially suitable for switching relatively high frequency electrical signals, and, more particularly, but not necessarily exclusively, to a novel cross-bar switch construction enabling the selective switching of a relatively high frequency input signal from an input circuit to one or more output circuits as desired.

The present invention is an improvement on the cross-bar switch constructions shown in United States Patents Nos. 2,729,706 and 2,731,516 to A. W. Vincent, and in the copending patent application of A. W. Vincent, Serial No. 42,422, filed July 18, 1960, entitled, "Method of Making Contact Members for Crossbar Switch."

High frequency signals such as, for example, television video signals present relatively difficult switching problems, especially in those cases where it is desired to provide relatively versatile switching arrangements enabling an operator selectively to direct any one or more of plural input signals to any one or more of plural output circuits. The problem is of present commercial urgency in connection with the routing of television video signals, and with the control of network routing of television and radio signals, and has led to the development of relatively complex and expensive switching apparatus, some of which include large numbers of solid state and other electronic devices.

The problems involved appear to relate primarily to so-called cross-talk, and to impedance mis-matches, both of which become increasingly severe with increases in signal frequency.

Accordingly, one important object of the present invention is to provide improved, relatively simple and inexpensive electromechanical switching apparatus capable of handling relatively high frequency electrical signals.

Another object is to provide improved switching apparatus of this type in which cross-talk is reduced relative to other electromechanical switching apparatus.

Another object is to provide switching apparatus of this type including means for maintaining the input impedance of each input circuit substantially constant and independent of the number of output circuits to which it may be connected at any given time, thereby to preserve an impedance match between the input circuit and the signal delivery circuit connected to it.

Another object is to provide electrical switching apparatus of this type, which has generally advantageous and desirable electrical characteristics in the relatively high frequency range, including a relatively low cross-talk level and constant input impedance, yet which is highly versatile and readily arranged to provide selective connections between a relatively large number of input circuits and a relatively large number of output circuits; and in general to provide a cross-bar switch of this type which is relatively inexpensive to manufacture, and highly reliable, rugged, and long-lasting in service.

The foregoing and other objects and advantages of the invention will become apparent from the following detailed description of a presently preferred embodiment thereof, taken in conjunction with the drawings, wherein.

Figures 1, 2:
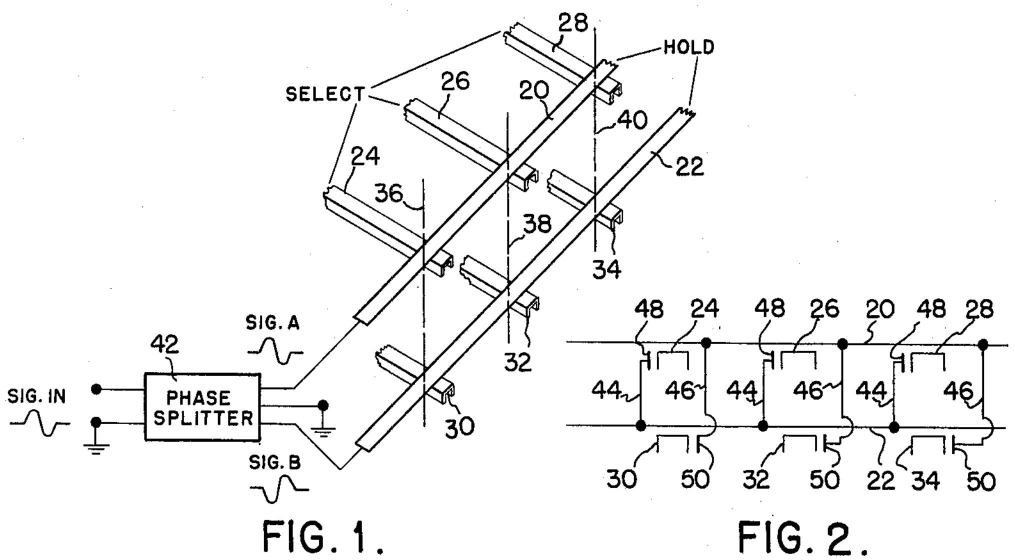
FIG. 1 is a schematic diagram illustrating a first feature of the invention.
FIG. 2 is a schematic diagram illustrating a second feature of the invention.

In accordance with the present invention, it has now been found that in a cross-bar switch of the general type described in the hereinabove-identified patents and patent application, the use of a balanced input signal reduces cross-talk by about 20 db, or more, when relatively high frequency signals of, say, about 10 megacycles or higher are transmitted through the switch. One feature of the invention, therefore, pertains to the use of a so-called balanced signal, that is, to transmitting two signals simultaneously through the switch, the signals having the same instantaneous absolute values but being of opposite polarity relative to a reference potential. This mode of operation produces a first order cancellation effect in the cross-talk, so that an output conductor which is disconnected from the input conductors that carry the two opposing signals, will receive opposing signals from them that tend to cancel each other. The net cross-talk is thus reduced substantially relative to the cross-talk that is produced in the absence of the opposing signal.

Although the use of a balanced signal provides improved results and achieves a significant reduction in cross-talk, sufficient cross-talk ordinarily remains, especially at signal frequencies of several tens of megacycles and more to be objectionable in many applications. According to a second feature of the invention, the cross-talk may be practically completely eliminated, and in practice has been further reduced by at least about 40 db, by providing capacitive coupling means to compensate for the unequal capacitive coupling between the input conductors and different ones of the output conductors.

In a cross-bar switch of the type with which the present invention is primarily concerned, plural input, or hold conductors extend in parallel array in a common plane, and the output, or select conductors extend also in parallel array normal to the plane of the hold conductors. The select conductors are arranged in planes closely spaced from the hold conductors, and contact means are provided for selectively electrically connecting the select conductors to the hold conductors at points near where they cross each other.

In this arrangement, it is not feasible within the present limits of industrial technology to arrange the hold and select conductors so that the leakage, or stray capacitance between a hold conductor and the select conductors in the plane next adjacent to that hold conductor is equal to the stray capacitance between that hold conductor and select conductors in a different plane. This unequal stray capacitance has been found to cause cross-talk even when the balanced signal arrangement is used.

In the arrangement according to the invention, the capacitive coupling between the various hold and select conductors is equalized, so that when two equal and opposite signals are applied to adjacent hold conductors, equal portions of the applied signals are transmitted through the capacitive coupling to all of the select conductors. Substantially complete cancellation of the capacitively fed signals may thus be achieved.

A further problem in switching high frequency signals has to do with impedance matching. It is relatively simple to connect the select conductor outputs to amplifiers having relatively high impedance input circuits, and thereby to minimize the resistive effect on the hold conductor circuits caused by the making and breaking of contacts between the hold conductors and the various select conductors. This expedient, however, cannot compensate for changes in capacitance caused by making or breaking the contacts. For this reason, mechanical switching has heretofore been regarded as impractical when dealing with signals in the frequency range where impedance matching is of importance.

It has been found that the hold conductor circuits of cross-bar switches of the type illustrated herein are very much like transmission lines insofar as their electrical characteristics are concerned, and can be made substantially free of reactance. Making of a contact between a select conductor and a hold conductor, however increases the capacitance of the hold conductor circuit at the contact point, so as to upset an impedance match that has been established between a signal delivering circuit and the hold conductor circuit. This does not present a severe problem in those instances where it is known that the hold conductor will be connected to one and only one select conductor at all times. It is, however, often desired to provide for plural routing of a given signal, so that, as desired, the hold conductor may be connected to any desired number of select conductors without effecting a change in the characteristic impedence of the hold conductor circuit.

This problem is solved according to the invention by providing compensating inductors and capacitors in the hold conductor circuit, and means for disconnecting the capacitors selectively when the hold conductor is connected to the select conductors. The inductors are arranged in series along the hold conductor between the contact points where the hold conductor is connectable to the various different select conductors. The inductors are selected to be of a value to match the capacitance added to the hold conductor when the respective select conductors are connected to it, thereby to preserve the resistive nature of the impedance of the hold conductor circuit. The capacitors are connected through switch contacts between a ground plate and the hold conductor at points between the inductors, and are selected to be equal in value to the change of capacitance effected in the hole conductor circuit by connecting one of the select conductors to the hold conductor. The switch contacts are arranged to open, thereby to disconnect the capacitors when the connection is made between the hold and the select conductor at the particular capacitor location.

Thus, the impedance of the hold conductor circuit as seen by a signal delivering circuit remains constant regardless of how many select conductors are connected to it.

Referring now to the drawings, FIG. 1 diagrammatically illustrates the general organization of the cross-bar switch in simplified form, showing two hold conductors 20 and 22 arranged horizontally in a vertical plane, and six select conductors 24, 26, 28, 30, 32, and 34 arranged in two spaced horizontal planes normal to the plane of the hold conductors 20 and 22. The first three select conductors 24, 26, and 28 are directly beneath and relatively close to the upper hold conductor 20, and the second three select conductors 30, 32, and 34 are directly beneath and relatively close to the lower hold conductor 22.

The select conductors 24-34 are in the form of channel bars, and are relatively rigid. The hold conductors 20 and 22 are relatively flat, highly flexible and lightly resilient ribbons, so that they may be locally depressed into contact with the respective select conductors. Means indicated by the dashed lines 36, 38, and 40 are provided for locally depressing the hold conductors 20 and 22 to bring them into contact with the respective select conductors at the crossing points. For example, the upper hold conductor 20 may be electrically connected to any one or more of the three upper select conductors 24, 26, and 28, and the lower hold conductor 22 may be connected to any one or more of the lower select conductors 30, 32, and 34. A single actuator 36, 38, or 40 is provided for all vertically aligned contact points, so that when the upper hold conductor 20 is connected to the first upper select conductor 24, the lower hold conductor 22 is connected to the first lower select conductor 30, and so on.

This arrangement of the conductors minimizes capacitive coupling between the various conductors. First, there is a relatively wide spacing between the hold conductors 20 and 22, and between the various select conductors 24–34, and second, there is a minimum confronting surface area between each hold conductor 20 and 22 and each select conductor 24–34 because they cross at right angles to each other. Nevertheless, principally because the contact surfaces of the switch contacts must be relatively close to each other when the contacts are open in order to provide for high speed switching action, there is appreciable capacitive coupling between the hold and the select conductors, which produces cross-talk in the switch when it is attempted to transmit relatively high frequency signals through it. That is, a high frequency signal applied between one hold conductor 20 or 22 and a ground plate is transmitted through stray capacitive coupling to all of select conductors 24–34, even though the contacts between the hold conductors and the select conductors are open.

FIG. 1 illustrates the arrangement according to the first feature of the invention for reducing cross-talk caused by stray capacitance. The arrangement includes a phase-splitting amplifier 42, or other similar device for applying the high frequency signal it is desired to transmit through the switch between a point of reference potential and the upper hold conductor 20, and for producing a second signal of equal instantaneous magnitude but of opposite polarity from the desired signal and applying it between the reference point and the other hold conductor 22. The two signals as thus applied are referred to as a balanced signal. If they were to be combined, they would cancel each other.

By transmitting a balanced signal in a switch of this type, the two portions of the signal being applied to two adjacent hold conductors, a reduction in cross-talk of about 20 db has been achieved in the frequency range of about 1 to 10 megacycles relative to the cross-talk encountered when only an unbalanced, or single phase signal is transmitted through the switch.

For many applications, the balanced signal arrangement provides satisfactory results. In other cases, however, the cross-talk remains at an intolerable level. Further reduction in cross-talk may then be achieved according to the invention by equalizing the capacitive coupling between the hold conductors 20–22 and the various different select conductors 24–34. In this type of switch it is not presently feasible to provide equal stray capacitive coupling between any one hold conductor and two select conductors in different respective planes. The maximum coupling effect is present across the open contact points, which are arranged for connecting any given hold conductor only to those select conductors in the plane next adjacent to the hold conductor. There is a substantially smaller coupling between the hold conductor and those select conductors to which it is not connectable.

According to the invention, the capacitive coupling between the hold conductors 20 and 22 and the respective select conductors 24–34 is equalized by extending relatively short bridge conductors 44 and 46 (FIG. 2) from the respective hold conductors 20 and 22 to the relatively remote ones of the select conductors 24–34. The bridge conductors 44 and 46 terminate in relatively small conductive plates 48 and 50, which are positioned adjacent to the select conductors 24–34. The plates 48 and 50 are adjusted in size and spacing from the respective select conductors 24–34 to equalize the capacitive coupling between the hold conductors and the select conductors.

Figure 3:
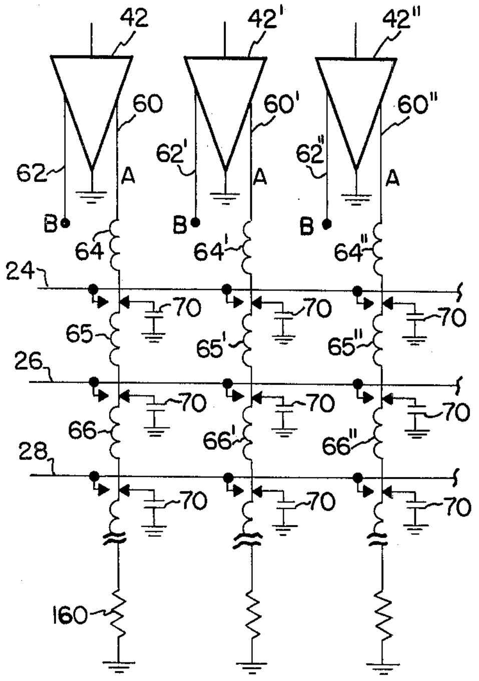
FIG. 3 is a schematic diagram illustrating a third feature of the invention.
Figure 4:
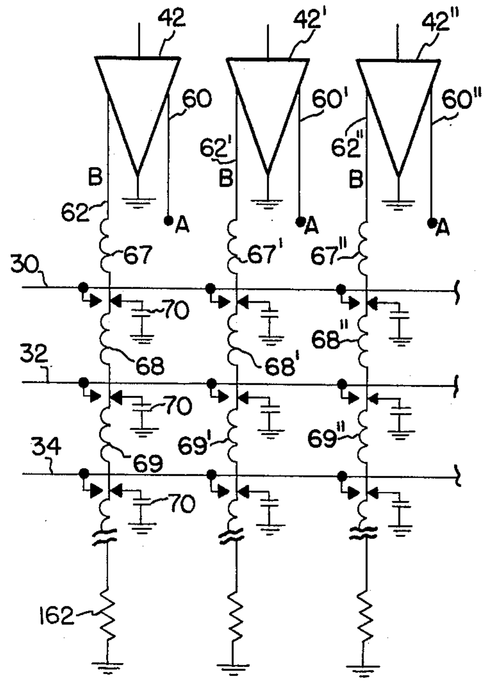
FIG. 4 is a schematic diagram which, taken together with FIGS. 1 and 3, illustrates a fourth feature of the invention.

The arrangement for maintaining an input impedance match is schematically shown in FIGS. 3 and 4, which may be thought of as horizontal sectional views of the cross-bar switch taken in planes parallel to the banks of select conductors 24–34 of FIG. 1. FIGS. 3 and 4 show respective successive levels of the switch, which, as shown, includes three pairs of hold conductors 60 and 62, 60′ and 62′, and 60″ and 62″, one hold conductor of each pair being shown in each figure along with its associated select conductors, that is, along with the particular select conductors 24–34 with which the hold conductors are connectable.

Relatively small value inductors 64–69, 64′–69′, and 64″–69″ are connected in series along the respective hold conductors. The inductors are selected in value to match the capacitance added by connecting the respective select conductors 24–34 to the respective hold conductors, thereby to maintain the characteristic impedance of the hold conductors circuits constant and substantially free of reactance when the select conductors are connected to the hold conductors.

Auxiliary compensating capacitors 70 are arranged to be connected to the respective hold conductors 60, 62, 60′, 62′, 60″, and 62″ at the contact points during times when the corresponding select conductors 24–34 are disconnected from the hold conductors. The auxiliary capacitors are selected to be equal in value to the capacitance added by connecting the respective select conductors 24 to 34 to the hold conductors, so that they match the inductance added to the hold conductors by the inductors 64–69, 64′–69′, and 64″–69″ during times when the select conductors 24–34 are disconnected, thereby to preserve the resistive nature of the hold conductor circuits.

Figure 5:
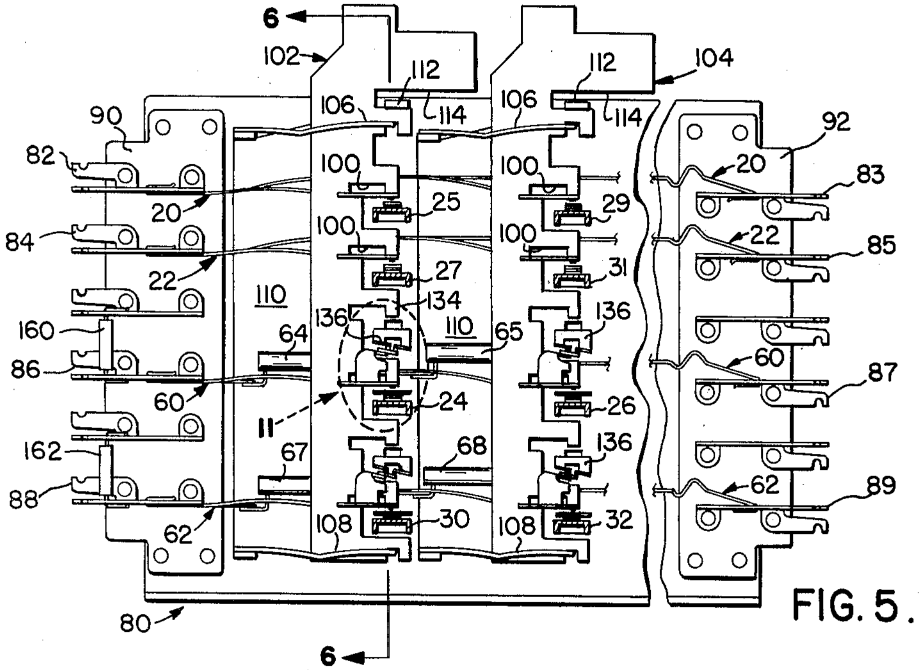
FIG. 5 is an elevational view of a line plate in a cross-bar switch according to the invention incorporating the four features that are schematically shown in FIGS. 1 to 4.
Figure 6:
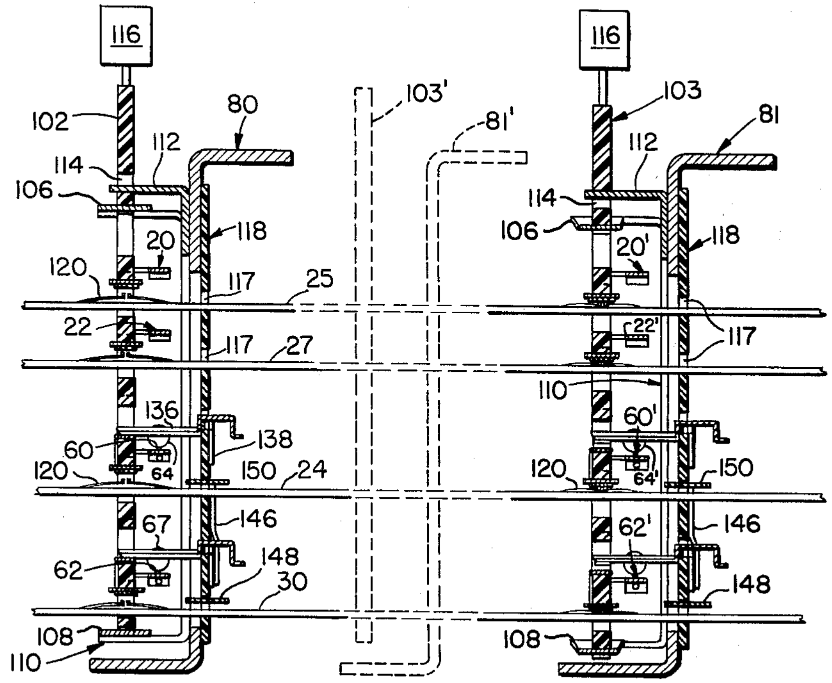
FIG. 6 is a fragmentary, cross-sectional view of a cross-bar switch including plural line plates similar to the line plate shown in FIG. 5, the view of each line plate being taken along the line 6—6 of FIG. 5.
Figure 7:
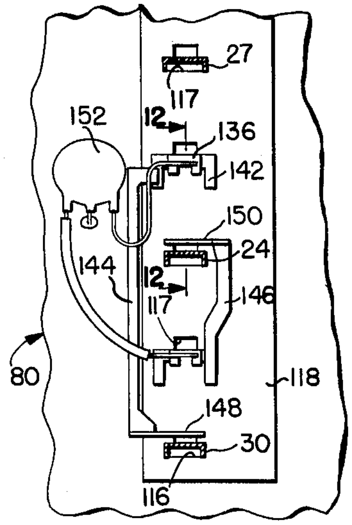
FIG. 7 is a fragmentary, rear elevational view, on an enlarged scale of a portion of the line plate shown in FIG. 5.

Detailed construction features of the cross-bar switch according to the presently preferred embodiment of the invention are shown in FIGS. 5–11. FIG. 5 is an elevational view of a line plate assembly including a conductive line plate 80 upon which the various insulators, conductors, and actuators of the switch are mounted. The line plate 80 is ordinarily arranged in parallel array with one or more additional line plates 81 and 81′ as indicated in FIG.6, to form a multi-position cross-bar switch. The hold conductors 20, 22, 60, and 62, extend generally parallel to the line plate 80, and are fixed at their respective opposite ends to terminals 82–89, which are mounted on insulating panels 90 and 92 at the opposite respective ends of the plate 80. The terminals 82–89 and the hold conductors, 20, 22, 60, and 62 are insulated from the line plate 80 by the panels 90 and 92.

The two upper hold conductors 20 and 22, as shown, are intended for handling relatively low frequency or direct current electrical signals, and the two lower hold conductors 60 and 62 are shown as modified according to the present invention for handling relatively high frequency signals. The high frequency signals are ordinarily the ones of principal concern, but it is also often desired to provide for switching one or more low frequency, or direct current signals simultaneously with the switching of the high frequency signals for indicating or auxiliary control purposes.

Figure 8:
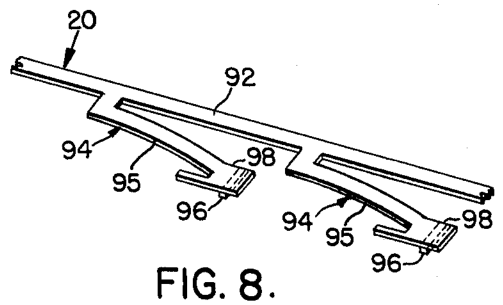
FIG. 8 is an isometric, fragmentary view, on an enlarged scale of one of the flexible input, or hold conductors mounted on the line plate shown in FIG. 5, illustrating the conductor separate from the line plate.

The two upper hold conductors 20 and 22 are constructed as shown in FIG. 8. Each one includes an elongated, relatively narrow, flexible, and lightly resilient strip of a conductive material such as beryllium copper, or the like, extending continuously between the terminals 82 and 83, or the terminals 84 and 85. L-shaped cantilever arms 94 formed integrally with the strip 92 extend therefrom at intervals along its length for supporting it at spaced points between the terminals 82 and 83, or 84 and 85. The cantilevered arms 94 carry contact bars 96 at their distal ends for making electrical contact with the select conductors 24–32. Each of the cantilevered arms 94 includes an elongated portion 95, which extends generally parallel to and slightly spaced outwardly from the strip 92, and which terminates in an upwardly inclined, integral tab 98. The tab 98 is shaped to fit into and to be retained in a reentrant notch 100 (FIGS. 5 and 11) in the actuator bar 102 or 104. The upwardly inclined tab 98 of the cantilever arm 94 is held in a substantially horizontal position as viewed in FIG. 5 by the reentrant notch 100, and the elongated portion 95 is thus urged upwardly to exert a supporting force on the strip 92 at the point where the arm 94 connects with it.

The actuators 102 and 104 are of insulating sheet material such as a reinforced synthetic resin. They are supported in slots (not separately designated) in leaf springs 106 and 108, which are fixed to mounting brackets 110, and which urge the actuators 102 and 104 upwardly as viewed in FIG. 5. The brackets 110 are riveted, or otherwise firmly secured to the line plate 80, and include outwardly projecting abutment lugs 112, which extend into slots 114 in the actuators 102 and 104 for limiting the travel of the actuators 102 and 104 in both directions. As indicated in FIG. 6, the actuators 102 and 104 may be moved downwardly against the biasing force of the springs 106 and 108 by any desired means such as, for example, the schematically shown solenoid actuators 116.

The select conductors 24–32 extend normally through the line plates 80 and 81, through closely fitting apertures 117 in sheets 118 of insulating material. The insulating sheets 118 extend across relatively large apertures (not separately designated) in the line plates 80 and 81, and are secured to the line plates 80 and 81, respectively. The select conductors 24–32 may be similar to those described in the hereinabove-identified Vincent copending application, and are formed with integral, cantilevered contact fingers 120, which mount contact points 122 (FIG. 10) at their free ends. The select conductors 24–32 are positioned with their contact points 122 directly beneath the contact bars 96 of the hold conductors 20, 22, 60, and 62.

When the actuators 102 and 104 are in their raised positions, the contact bars 96 are supported clear of the contact points 122 of the select conductors. The actuator 102 shown in the left-hand portion of FIG. 6 is illustrated in its normal, or retracted position, with the hold conductors disconnected from the select conductors. When the actuator 102, 103, or 104 is advanced against the urging of the biasing springs 106 and 108, it carries the contact bars 96 of the hold conductors into engagement with the respective contact points 122 of the select conductors, thereby effecting simultaneous connections between the hold conductors 20, 22, 60, and 62 and the respective select conductors 24–32 that are vertically aligned with the actuator that is advanced. The actuator 103 at the right-hand side of FIG. 6 is shown in its advanced, or contact closed position.

Figure 9:
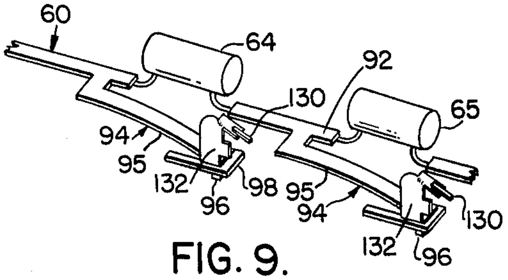
FIG. 9 is an isometric, fragmentary view, on an enlarged scale of another one of the hold conductors from the line plate shown in FIG. 5, showing the conductor separate from the line plate.
Figures 10, 11, 12:
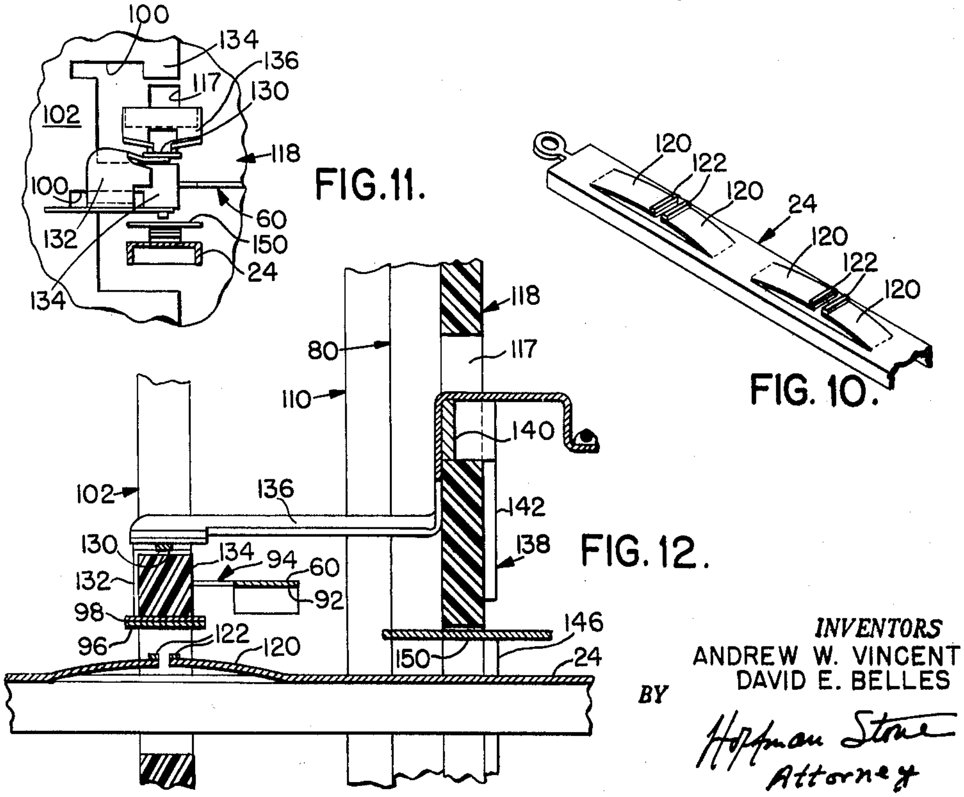
FIG. 10 is a fragmentary isometric view of a select conductor of the cross-bar switch shown in FIG. 6.
FIG. 11 is an enlarged view of that portion of FIG. 5 included in the circle 11 thereof.
FIG. 12 is a cross sectional view, on an enlarged scale, taken along the line 12—12 of FIG. 7.

That portion of the detailed switch structure so far described is substantially similar to the structure described in the hereinabove-identified Vincent copending application. According to the present invention, the cross-bar switch is modified by providing back contacts on the tabs 98 of those ones of the hold conductors that are to be used for transmitting relatively high frequency signals. As best seen in FIGS. 9, 11, and 12, the back contacts 130 are mounted on small U-shaped brackets 132, which are welded, or otherwise conductively secured to the tabs 98, and which fit over the arms 134 of the actuators above the reentrant slots 100 when the tabs 98 are fitted into the slots. When the actuators 102–104 are in their raised, or retracted positions, the back contacts 130 engage auxiliary fixed contacts 136, which are mounted on the insulating sheets 118 and extend outwardly therefrom for engagement by the contacts 130. The fixed contacts 136 extend through apertures 117 in the insulating sheets 118 similar to the apertures 117 through which the select conductors 24–32 extend, and are retained in place by clips 138, each one of which includes a U-shaped portion 140 and a pair of contact arms 142 extending outwardly and downwardly from the U-shaped portion 140. The U-shaped portion 140 is squeezed into the aperture 117 in the insulating sheet 118 and welded to the fixed contact 136 to bind the contact 136 in the aperture. The contact arms 142 of the clip then lie flat against the insulating sheet 118 beneath the aperture.

Bridge conductors 144 and 146 are welded, or otherwise conductively secured to the clips 138 and terminate in capacitive plate 148 and 150, which are positioned closely adjacent to select conductors remote from the hold conductors to which the respective bridge conductors connect. For example, referring to FIG. 5, the auxiliary fixed contact 136 arranged to be connected to the next to the bottom hold conductor 60 when the first actuator 102 is in its retracted position is connected to the bridge conductor 144, which terminates at the plate 148 positioned adjacent to the bottom select conductor 30. The normal stray capacitance across the contacts between the hold conductor 60 and the next adjacent select conductor 24 is of relatively high value, while the stray capacitance between the hold conductor 60 and the bottom select conductor 30 is of a relatively low value. Connecting the bridge conductor 144 in the manner described serves to increase the capacitive coupling between the hold conductor 60 and the bottom select conductor 30 to a value approximately equal to the stray capacitance between the hold conductor 60 and the select conductor 24 immediately adjacent to it.

Similarly, the bridge conductor 146 and the plate 150 serve to equalize the capacitive coupling between the bottom hold conductor 62 and the two select conductors 24 and 30 on opposite respective sides of it.

With this arrangement, and using a balanced signal according to the invention, cross-talk may be substantially completely eliminated. The desired input signal is applied between the first high frequency hold conductor 60 and the line plate 80, and a second signal of equal absolute instantaneous value as the desired signal but of opposite polarity (180° phase difference) is applied between the second hold conductor 62 and the line plate 80. The capacitive coupling arrangement through the bridge conductors 144 and 146 then insures that equal portions of both signals are transmitted to all of the select conductors 24–32 that are disconnected from the hold conductors 60 and 62. The two signals substantially completely cancel each other in the select conductors, so that no signal output is produced except between the line plate 80 and those of the select conductors that are connected to the hold conductors 60 and 62 through the contact bars 96.

In order to provide for impedance matching, the hold conductors are modified as illustrated in FIG. 9 by inserting inductors 64 in series in the strip 92. This may be done by starting with a hold conductor such as the hold conductor 20 shown in FIG. 8, cutting out portions thereof between each two of the contact arms 94, and then, by use of an appropriate jig to maintain the desired spacing between the contact tabs 98, welding or soldering the terminal wires (not separately designated) of the inductors 64 and 65 in place on the strip 92. The inductors 64 and 65 are arranged along the strip 92 to conform to the electrical schematic diagrams of FIGS. 3 and 4, being placed ahead of the contact arms 94 counting from the terminal 87 or 89 (FIG. 5) at which the input signal is applied.

The inductors 64 and 65 are selected in value to match the capacitance added to the hold conductors 60 and 62 when the respective select conductors 24–32 are connected to them, and thereby to maintain the resistive nature of the input impedance of the input circuits formed by the hold conductors 60 and 62 and the line plate 80.

Compensating capacitors 152 are connected between the fixed back contacts 136 and the line plate 80 to compensate for the loss of the capacitance due to the respective select conductors when the select conductors are disconnected from the hold conductors. Single three-plate capacitors such as the capacitor 152 shown in FIG. 7 may be used for this purpose, with their middle plates connected directly to the line plate 80, and their opposite end plates connected respectively to two vertically aligned ones of the fixed back contacts 136.

The impedance of the input circuits thus remains constant regardless of how many of the select conductors 24 to 32 are connected at any give moment to the hold conductors 60 and 62.

The input circuits constituted by the hold conductors 60 and 62 and the line plate 80 may be terminated by resistors 160 and 162, respectively, equal in value to the characteristic impedance of the input circuits.

We claim:

1. In combination with an electrical cross-bar switch of the type having plural elongated hold conductors arranged in parallel array in a common plane, plural select conductors extending normally to the common plane, different ones of the select conductors being relatively closely adjacent to different respective ones of the hold conductors, and contact means for selectively and alternately making and breaking electrical connections between the hold conductors and the select conductors, the improvement comprising means for applying a first alternating current signal between a point of reference potential and a first one of the hold conductors, means for producing a second electrical signal of the same instantaneous magnitude as the first signal but of opposite instantaneous polarity therefrom, and means for applying said second signal between the point of reference potential and one of the hold conductors next adjacent to said first one, whereby signal transmission by stray coupling between the hold conductors and the select conductors will be compensated by the opposing effect of said first and second signals.

2. In combination with an electrical cross-bar switch of the type having first and second elongated hold conductors arranged parallel to each other, a first bank of select conductors arranged parallel to each other and generally normal and adjacent to the first hold conductor, a second bank of select conductors arranged parallel to each other and generally normal and adjacent to the second hold conductor, contact means arranged adjacent to the points where the hold conductors and the select conductors cross each other for selectively connecting the select conductors of the first bank to the first hold conductor and the select conductors of the second bank to the second hold conductor, the improvement comprising means for applying a first alternating current signal between the first hold conductor and a point of reference potential, means for producing a second alternating current signal of equal instantaneous magnitude but of opposite polarity from the first signal, and means for applying said second signal between the point of reference potential and the second hold conductor, whereby signal transmission by stray coupling between the hold conductors and the select conductors will be compensated by the opposing effect of the first and second signals.

3. In a cross-bar switch of the type having input hold conductors, plural output select conductors, and contact means for selectively connecting the hold conductors to the select conductors, and in which the stray capacitive coupling between a particular hold conductor and a first select conductor is greater than the stray capacitive coupling between the particular hold conductor and a second select conductor, the improvement comprising auxiliary capacitive coupling means for equalizing the capacitive coupling between the particular hold conductor and the first and second select conductors.

4. In combination with an electrical cross-bar switch of the type having plural elongated hold conductors arranged in parallel array in a common plane, plural select conductors extending normally to the common plane, different ones of the select conductors being relatively closely adjacent to different respective ones of the hold conductors, and contact means for selectively and alternately making and breaking electrical connections between the hold conductors and the select conductors, the improvement comprising a conductive plate positioned adjacent to one of the select conductors, and means for connecting said plate to one of the hold conductors that has a greater electrical spacing from said one select conductor than another hold conductor thereby to increase the capacitive coupling between said one select conductor and said one hold conductor relative to the inherent stray coupling between them.

5. In an electrical cross-bar switch of the type having plural elongated hold conductors extending in a common plane in a first coordinate direction, plural select conductors extending in common planes in a second coordinate direction normal to said first direction and crossing the hold conductors, each one of the common planes of the select conductors being positioned relatively closely to a different one of the hold conductors, and contact means actuatable in a third coordinate direction normal to both said first and said second directions for selectively electrically connecting the hold conductors to the select conductors close to the respective hold conductors whereby each hold conductor may be connected to any of the select conductors in the plane close to it, the improvement comprising capacitive coupling means connectable between one hold conductor and a select conductor in a plane close to a different hold conductor for supplementing the inherent stray capacitance between the one hold conductor and the select conductor and making the total capacitive coupling therebetween approximately equal to the inherent stray capacitance between the one hold conductor and a select conductor in the plane close thereto.

6. In a cross-bar switch of the type having a conductive body member, a hold conductor capacitively coupled to the body member, plural select conductors capacitively coupled to the body member, and contact means for selectively connecting the hold conductor to the select conductors, and in which closing of the connections between the hold and the select conductors effects increases in the capacitance between the hold conductor and the body member, the improvement comprising auxiliary capacitors each having one terminal connected to the body member, and means responsive to the contact means for connecting the opposite terminals of said capacitors to the hold conductor when the select conductors are disconnected therefrom.

7. In a cross-bar switch of the type having a conductive body member, a hold conductor capacitively coupled to the body member, plural select conductors capacitively coupled to the body member, and contact means for selectively connecting the hold conductor to the select conductors, and in which closing of the connections between the hold and the select conductors effects increases in the capacitance between the hold conductor and the body member, the improvement comprising auxiliary capacitors each having one terminal connected to the body member, and means responsive to the contact means for connecting the opposite terminals of said capacitors to the hold conductor when the select conductors are disconnected therefrom, said capacitors being approximately equal in value to the increase of capacitance effected by connecting the select conductors to the hold conductor, whereby the capacitance between the hold conductor and the body member is substantially unaffected by the operation of the contact means.

8. In an electrical cross-bar switch of the type having a flat conductive mounting plate, an elongated hold conductor, means mounting the hold conductor parallel to and insulated from the plate, plural select conductors, insulating means mounting the select conductors through the plate normal thereto and adjacent to the hold conductor, switch contact means for electrically connecting the select conductors to the hold conductor at respective spaced points along the length thereof, and actuator means for actuating the switch contact means, the improvement comprising means for increasing the inductance of the hold conductor relative to the inductance of a straight conductor of the same length, thereby to compensate for the capacitance added to the hold conductor by connecting the select conductors to it.

9. In an electrical cross-bar switch of the type having a flat conductive mounting plate, an elongated hold conductor, means mounting the hold conductor parallel to and insulated from the plate, plural select conductors, insulating means mounting the select conductors through the plate normal thereto and adjacent to the hold conductor, switch contact means for electrically connecting the select conductors to the hold conductor at respective spaced points along the length thereof, and actuator means for actuating the switch contact means, the improvement comprising inductors connected in series in the hold conductor between the spaced points therealong for compensating for the capacitance added to the hold conductor by connecting the select conductors to it and thereby maintaining the resistive character of the signal input circuit formed by the plate and the hold conductor.

10. In combination with an electrical cross-bar switch of the type having first and second elongated hold conductors arranged parallel to each other, a first bank of select conductors arranged parallel to each other and generally normal and adjacent to the first hold conductor, a second bank of select conductors arranged parallel to each other and generally normal and adjacent to the second hold conductor, contact means arranged adjacent to the points where the hold conductors and the select conductors cross each other for selectively connecting the select conductors of the first bank to the first hold conductor and the select conductors of the second bank to the second hold conductor, the improvement comprising means for applying a first alternating current signal between the first hold conductor and a point of reference potential, means for producing a second alternating current signal of equal instantaneous magnitude but of opposite polarity from the first signal, means for applying said second signal between the point or reference potential and the second hold conductor, and capacitive coupling means for equalizing the capacitive coupling between both hold conductors and the select conductors of both banks, whereby signal transmission by stray coupling between the hold conductors and the select conductors will be compensated by the opposing effect of the first and second signals.

11. In combination with an electrical cross-bar switch of the type having plural elongated hold conductors arranged in parallel array in a common plane, plural select conductors extending normally to the common plane, different ones of the select conductors being relatively closely adjacent to different respective ones of the hold conductors, and contact means for selectively and alternately making and breaking electrical connections between the hold conductors and the select conductors, the improvement comprising means for applying a first alternating current signal between a point of reference potential and a first one of the hold conductors, means for producing a second electrical signal of the same instantaneous magnitude as the first signal but of opposite instantaneous polarity therefrom between the point of reference potential and one of the hold conductors next adjacent to said first one, and capacitive coupling means for equalizing the capacitive coupling between said one hold conductor and the select conductors adjacent thereto with the capacitive coupling between said one hold conductor and the select conductors adjacent to said next adjacent hold conductor, whereby signal transmission by stray coupling between the hold conductors and the select conductors will be compensated by the opposing effect of said first and second signals.

12. In a cross-bar switch of the type having a conductive body member, a hold conductor capacitively coupled to the body member, plural select conductors capacitively coupled to the body member, and contact means for selectively connecting the hold conductor to the select conductors, and in which closing of the connections between the hold and the select conductors effects increases in the capacitance between the hold conductor and the body member, the improvement comprising auxiliary capacitors each having one terminal connected to the body member, means responsive to the contact means for connecting the opposite terminals of said capacitors to the hold conductor when the select conductors are disconnected therefrom, and inductive means in series with the hold conductor for matching the capacitance between the hold conductor and the body member and thereby making the circuit constituted by them substantially non-reactive.

13. In an electrical cross-bar switch of the type having plural elongated hold conductors extending in a common plane in a first coordinate direction, plural select conductors extending in common planes in a second coordinate direction normal to said first direction and crossing the hold conductors, each one of the common planes of the select conductors being positioned relatively closely to a different one of the hold conductors, and contact means actuatable in a third coordinate direction normal to both said first and said second directions for selectively electrically connecting the hold conductors to the select conductors close to the respective hold conductors whereby each hold conductor may be connected to any of the select conductors in the plane close to it, the improvement comprising means for increasing the inductance of a hold conductor relative to the inductance of a straight conductor of the same length thereby to compensate for the capacitance added to the hold conductor by the making of the electrical connections between it and the select conductors, a capacitor having one terminal connected to a point of reference potential, and auxiliary contact means for connecting the hold conductor to the second terminal of said capacitor during times when the hold conductor is disconnected from a selected one of the select conductors.

14. In an electrical cross-bar switch of the type having a flat conductive mounting plate, an elongated hold conductor, means mounting the hold conductor parallel to and insulated from the plate, plural select conductors, insulating means mounting the select conductors through the plate normal thereto and adjacent to the hold conductor, switch contact means for electrically connecting the select conductors to the hold conductor at respective spaced points along the length thereof, and actuator means for actuating the switch contact means, the improvement comprising inductors connected in series in the hold conductor between the spaced points therealong, capacitors equal in number to the select conductors and each having one of its terminals directly connected to the mounting plate, and auxiliary contact means responsive to the actuating means for separately connecting the opposite terminals of said capacitors to the hold conductor at the spaced points therealong where the select conductor connections are effected by the first mentioned contact means, said capacitors being approximately equal in value to the capacitance added between the hold conductor and the plate by electrically connecting one of the select conductors to the hold conductor, said auxiliary contact means being arranged to connect said capacitors to the hold conductor when the respective select conductors are disconnected therefrom.

15. In a cross-bar switch of the type having a flat conductive plate defining a ground plane, first and second hold conductors, insulating support means for supporting the hold conductors parallel to each other and to the ground plane, first and second banks of select conductors, insulating support means for supporting the select conductors normal to the ground plane and extending through the conductive plate and crossing the hold conductors, movable contacts integral with the first hold conductor and spaced therealong for selectively connecting the first hold conductor to the select conductors of the first bank, movable contacts integral with the second hold conductor for selectively connecting the second hold conductor to the select conductors of the second bank, the movable contacts being engageable with the respective select conductors at points thereon adjacent to the places where the respective select conductors cross the hold conductors, the improvement comprising back contacts mounted on and insulated from the flat plate for contact engagement by the movable contacts when the movable contacts are disengaged from the select conductors, capacitors connected between said back contacts and the flat plate, said capacitors being approximately equal in value to the capacitance added to one of the hold conductors by connecting a select conductor to it, inductors connected in series with the hold conductors between the movable contacts thereof, said inductors being selected in value to match said capacitors and thereby to make the characteristic impedance of the input circuits constituted by the flat plate and the hold conductors substantially non-reactive, conductive plates fixed adjacent to the select conductors for capacitive coupling individually thereto, electrical leads connecting those of said conductive plates that are adjacent to the select conductors of the first bank to those of said back contacts that are engageable by the movable contacts of the second hold conductor, and electrical leads connecting those of said conductive plates that are adjacent to the select conductors of the second bank to the back contacts that are engageable by the movable contacts of the first hold conductor.

16. A cross-bar switch comprising a flat conductive plate defining a ground plane, first and second hold conductors, insulating support means for supporting said hold conductors parallel to each other and to said ground plane, first and second banks of select conductors, insulating support means for supporting said select conductors normal to said ground plane and extending through said conductive plate and crossing said hold conductors, movable contacts integral with said first hold conductor and spaced therealong for selectively connecting said first hold conductor to said select conductors of said first bank, movable contacts integral with said second hold conductor for selectively connecting said second hold conductor to said select conductors of said second bank, said movable contacts being engageable with respective ones of said select conductors at points thereon adjacent to the places where said select conductors cross said hold conductors, back contacts mounted on and insulated from said flat plate for contact engagement by said movable contacts when said movable contacts are disengaged from said select conductors, capacitors connected between said back contacts and said flat plate, said capacitors being approximately equal in value to the capacitance added to one of the hold conductors by connecting a select conductor to it, inductors connected in series with the hold conductors between the movable contacts thereof, said inductors being selected in value to match said capacitors and thereby to make the characteristic impedance of the input circuits constituted by the flat plate and the hold conductors substantially nonreactive, conductive plates fixed adjacent to said select conductors for capacitive coupling individually thereto, electrical leads connecting those of said conductive plates that are adjacent to the select conductors of said first bank to those of said back contacts that are engageable by said movable contacts of said second hold conductor, and electrical leads connecting those of said conductive plates that are adjacent to said select conductors of said second bank to said movable contacts of said first hold conductor.

17. In a cross-bar switch of the type having a conductive plate defining a ground plane, an elongated hold conductor parallel to and spaced from the ground plane, plural elongated select conductors arranged generally normally to the plate and spaced along the length of the hold conductors, and contact means for selectively and alternately closing and opening electrical connections between the hold and the select conductors, closing of the respective connections effecting increases in the capacitance between the hold conductor and the plate, the improvement comprising a resistor connected between one end of the hold conductor and the plate for terminating the signal transmission line constituted by the hold conductor and the ground plate at its characteristic resistance, means for providing inductive reactance in the hold conductor to match the capacitance added thereto by the closing of the connections between the hold conductor and the various select conductors, and means for capacitively coupling the hold conductor to the ground plate during times when the connections are open, whereby the characteristic transmission line impedance of the switch remains substantially constant despite continued alternate opening and closing of the connections by the contact means.

18. In a cross-bar switch of the type having a flat conductive plate defining a ground plane, first and second hold conductors, insulating support means for supporting the hold conductors parallel to each other and to the ground plate, first and second banks of select conductors, insulating support means for supporting the select conductors normal to the ground plane and extending through the conductive plate and crossing the hold conductors, movable contacts integral with the first hold conductor and spaced therealong for selectively connecting the first hold conductor to the select conductors of the first bank, movable contacts integral with the second hold conductor for selectively connecting the second hold conductor to the select conductors of the second bank, the movable contacts being engageable with the respective select conductors at points therein adjacent to the places where the respective select conductors cross the hold conductors, the improvement comprising back contacts mounted on and insulated from the flat plate for contact engagement by the movable contacts when the movable contacts are disengaged from the select conductors, capacitors connected between said back contacts and the flat plate, conductive plates fixed adjacent to the select conductors for capacitive coupling individually thereto, electrical leads connecting those of said conductive plates that are adjacent to the select conductors of the first bank to those of said back contacts that are engageable by the movable contacts of the second hold conductor, and electrical leads connecting those of said conductive plates that are adjacent to the select conductors of the second bank to the back contacts that are engageable by the movable contacts of the first hold conductor.

19. A cross-bar switch comprising a flat conductive plate defining a ground plane, first and second hold conductors, insulating support means for supporting said hold conductors parallel to each other and to said ground plane, first and second banks of select conductors, insulating support means for supporting said select conductors normal to said ground plane and extending through said conductive plate and crossing said hold conductors, movable contacts integral with said first hold conductor and spaced therealong for selectively connecting said first hold conductor to said select conductors of said first bank, movable contacts integral with said second hold conductor for selectively connecting said second hold conductor to said select conductors of said second bank, said movable contacts being engageable with respective ones of said select conductors at points thereon adjacent to the places where said select conductors cross said hold conductors, back contacts mounted on and insulated from said flat plate for contact engagement by said movable contacts when said movable contacts are disengaged from said select conductors, capacitors connected between said back contacts and said flat plate, conductive plates fixed adjacent to said select conductors for capacitive coupling individually thereto, electrical leads connecting those of said conductive plates that are adjacent to the select conductors of said first bank to those of said back contacts that are engageable by said movable contacts of said second hold conductor, and electrical leads connecting those of said conductive plates that are adjacent to said select conductors of said second bank to said movable contacts of said first hold conductor.

References Cited by the Examiner

UNITED STATES PATENTS

| | | | |
|---|---|---|---|
| 2,729,706 | 1/1956 | Vincent | 179—27.54 |
| 2,731,516 | 1/1956 | Vincent | 179—27.54 |
| 2,943,272 | 6/1960 | Feldman | 333—12 |
| 2,950,350 | 8/1960 | Vincent | 179—27.54 |

OTHER REFERENCES

"Crossbar Switch Applicator," by K. Enslein, Electrical Manufacturing, April 1958, pages 86–95.

ROBERT H. ROSE, *Primary Examiner.*

H. W. GARNER, F. N. CARTEN, *Assistant Examiners.*